United States Patent [19]

Hürlimann et al.

[11] 4,454,721
[45] Jun. 19, 1984

[54] CONSTANT-PRESSURE AIR-STORAGE CAVERN WITH HYDRALIC PRESSURE COMPENSATION FOR AIR-STORAGE GAS TURBINE POWER STATIONS

[75] Inventors: Reinhard Hürlimann, Zurich; Paul Zaugg, Baden, both of Switzerland

[73] Assignee: BBC Brown, Boveri & Company, Limited, Baden, Switzerland

[21] Appl. No.: 417,635

[22] Filed: Sep. 13, 1982

[30] Foreign Application Priority Data

Sep. 18, 1981 [CH] Switzerland ............... 6040/81

[51] Int. Cl.³ .............................................. F02C 3/00
[52] U.S. Cl. ................................... 60/659; 60/398; 405/55
[58] Field of Search ................ 60/398, 413, 659; 405/53, 55

[56] References Cited

U.S. PATENT DOCUMENTS

| | | | |
|---|---|---|---|
| 3,895,493 | 7/1975 | Rigollot | 60/398 X |
| 4,355,923 | 10/1982 | Schwarzehbach | 60/398 X |
| 4,403,477 | 9/1983 | Schwarzenbach | 60/659 |

Primary Examiner—Allen M. Ostrager
Assistant Examiner—Stephen F. Husar
Attorney, Agent, or Firm—Oblon, Fisher, Spivak, McClelland & Maier

[57] ABSTRACT

A constant-pressure air-storage cavern wherein the floor and the roof of the cavern are inclined at an acute angle with respect to the horizontal and the transition portion from the cavern into the air riser and into the water tunnel is expanded to form a dome and a sump, respectively. In the sump a vortex generator is provided.

5 Claims, 6 Drawing Figures

DETAIL I

CONSTANT-PRESSURE AIR-STORAGE CAVERN WITH HYDRALIC PRESSURE COMPENSATION FOR AIR-STORAGE GAS TURBINE POWER STATIONS

BACKGROUND OF THE INVENTION

1. Field of the Invention

The present invention relates to a constant-pressure air-storage cavern with hydraulic pressure compensation for air-storage gas turbine power stations in accordance with the pre-characterizing clause of claim 1.

2. Description of the Prior Art

In comparison with air-storage systems with variable air pressure which, in operation, is allowed to fluctuate within certain limits, and having an efficiency which is equal to that of constant-pressure air-storage systems for gas turbine power stations, the latter require only about a third of the volume of the former. Accordingly, the constructional effort and building costs for a cavern intended for constant-pressure storage are much less than for caverns intended for variable air pressure.

In order to maintain the air pressure constant in a constant-pressure storage system, a water seal is used which equalizes the volume of air consumed in the cavern and which is provided with a water column which opens into a free basin usually located at the surface of the earth and the static pressure head of which corresponds to the pressure to be maintained in the cavern. When the cavern, which in present-day installations is located at a depth of 600-800 m, corresponding to a static pressure of the water column of 60-80 bar, is charged the water is forced up into the basin and when the cavern is discharged the water flows from the basin back into the cavern in order to ensure that the pressure is the same.

In order to make it possible to alternately charge and discharge the storage cavern, shut-off elements, which must be appropriately actuated during the transition from charging to discharging operation and vice versa, are located between the air duct rising from the cavern and the compressor, on the one hand, and, on the other hand, in front of the combustion chamber of the turbine. If this change-over is not carried out correctly, for example if such accidentally remains wholly or partially open, or if a pipe leakage or a fault in the compressor blading occurs, the compressed air can escape from the cavern which causes the water in the cavern to rise. If the wrong operation of the abovementioned shut-off elements is not instantly corrected or the pipe leakage cannot be eliminated in the most rapid manner, the danger exists that, as a result of the gas evolution in the air duct because of the decrease in hydrostatic pressure, with a corresponding increase in the volume of the water/air mixture, the water will race up into the turbine plant which may have devastating consequences for the whole plant.

The suggestions which have hitherto become known for solving this problem are based on various principles. Some are based on shielding the water surface as completely as possible against contact with air and thus preventing the absorption of air in the water. This is associated with floatable mechanical means for covering the water such as floats carried on vertical rods, tarpaulins with bouyancy bodies, floating balls and similar means and covering layers, which float on the water, of a liquid with lighter specific gravity than water. Other suggestions have the object of preventing the bubbles forming in the water seal from rising into the basin above ground, the equalizing basin. The means used for this purpose include, for example, risers which open into the environment above the water level of the equalizing basin, turbine wheels which are intended to separate out small air bubbles before critical bubble formation occurs, and other mechanical measures which are in some cases very elaborate.

None of these suggestions are wholly satifactory in practice since they are constructionally elaborate and also not completely maintenance-free. In addition, their effectiveness has not been tested in practice and is thus still unproven.

SUMMARY OF THE INVENTION

The present invention has as its object the creation of a completely maintenance-free air-storage cavern in which the absorption of air in water is kept small enough, solely by means of geometric parameters of the shape of the cavern space in conjunction with operational measures, so that air bubbles which might still be generated in the water seal cannot be the cause of operational disturbances.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figures 1, 1A:
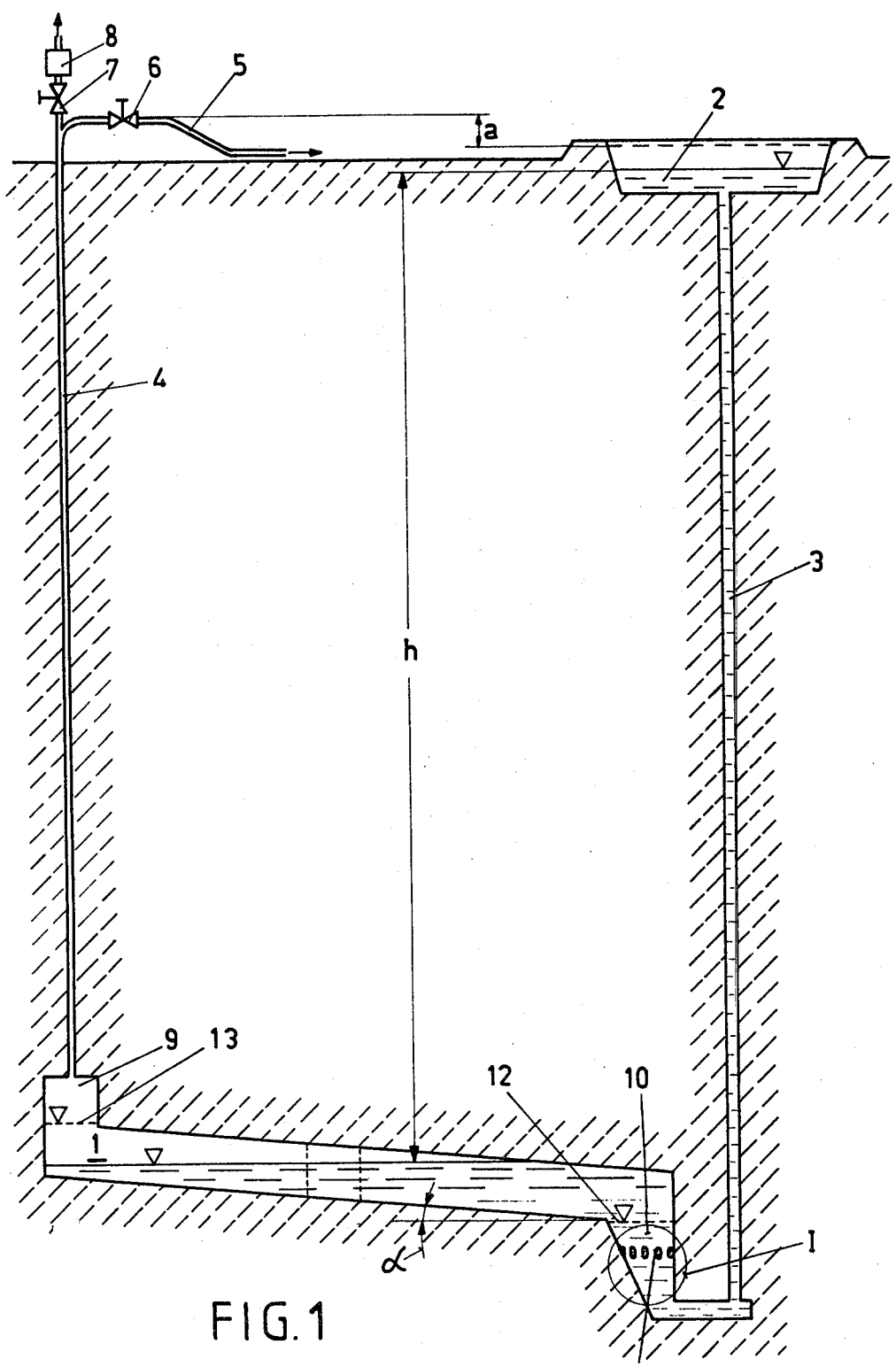
FIG. 1 shows a vertical sectional through a cavern structure of the type according to the invention.

In the cavern system of FIG. 1, the pressure head, given by the height of the upper water level in an equalizing basin 2 above the water level of the cavern in a storage cavern 1, is designated by h. The upper end of the water tunnel 3, in which the water seal is located, opens at the bottom of the equalizing basin 2. An air riser 4 passes above ground into a horizontal air feeder 5 which is provided with a shut-off element 6 and through which the air can be fed in the direction of the arrow to the combustion chambers of the gas turbine plant in the power house (not shown). In a vertical upward extension of the air riser a blow-off valve 7 and a muffler box 8 are provided through which it is possible, if necessary, to empty the storage cavern completely.

When the storage cavern 1 is being charged, the air forced in through the riser 4 displaces the water from the cavern 1 into the water tunnel 3 before it enters the equalizing basin 2. The pressure drops across the height of the water tunnel from the storage pressure, which corresponds to the pressure head h, for example 55 bar, to the atmospheric pressure of the environment.

The means of the suggestions mentioned in the introduction are intended to prevent a greater part of the air from separating out during this process while still inside the water tunnel and from rising upwards while forming great amounts of bubbles since this could lead to operational disturbances because of fluctuations in the water column or even to the complete blowing-out of the air in the storage cavern.

The content of air in the water mainly depends on the pressure and temperature in the cavern, on the time the water remains in the cavern and on the size of the water surface $A_{LW}$ in contact with air. According to the invention, the latter is very effectively achieved with minimum expenditure, in relation to the above mentioned known devices, by constructing the floor and the roof of the cavern 1 so as to be inclined at an angle a with respect to the horizontal. In practice, this means only an insignificantly greater expenditure with respect to normal caverns having a horizontal floor and a horizontal roof, while avoiding all complications associated with the initially mentioned known facilities intended to prevent blowing-out of the water seal.

Figure 2:
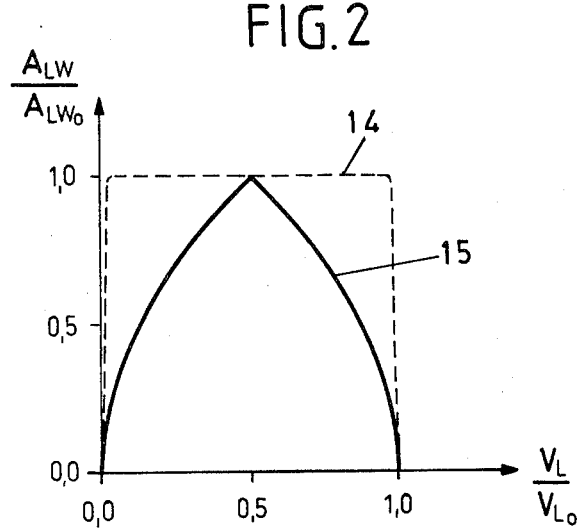
FIG. 2 shows a diagram which represents the relationship between the surface of the water in contact with air and the filling ratio of the cavern in a comparison between a conventional cavern shape and a cavern shape according to the invention.

Constructing the floor and the roof of the cavern to be inclined with respect to the horizontal, as can be seen from FIG. 1 and which is represented graphically in FIG. 2 in relationship to the filling ratio, has the effect that the water suface $A_{LW}$ in contact with air is partly greatly reduced in comparison with the purely horizontal cavern and that the absorption of air is correspondingly reduced. The magnitude of the inclination $\alpha$ is limited by the building costs which, admittedly, are a little higher than those of a horizontal cavern, and by a greater variation in the pressure head h and thus the storage pressure.

In the area of the entrance into the air riser 4 the cavern is expanded upwards to form a dome 9 and at the transition to the water tunnel 3 it is extended downwards into a sump 10. In this sump, a vortex generator 11 in the form of a grid of bars which cross each other is located. The figure insert "detail I" shows a plan view of this vortex generator.

During normal work cycles, the water level in the cavern varies as a maximum between the lowest level 12, when it is fully charged, and the highest level 13 when it is fully discharged. In FIG. 2, in which the ordinate $A_{LW}/A_{LW_o}$ represents the ratio of the water surface $A_{LW}$ in contact with air in a cavern to the plan area $A_{LW_o}$ of the cavern and the abscissa represents the filling ratio of the cavern, that is to say the ratio of the respective air-filled volume $V_L$ to the maximum storage volume $V_{Lo}$ of the cavern, the dashed curve 14 applies to a horizontal cavern and the curve 15, forming a pointed arc, applies to a cavern with an inclined floor and an inclined roof according to the invention. It can be seen that in the latter case the water surface in contact with air is equal to the plan area of the cavern, and thus equal to the water surface in contact with air of a horizontal cavern, only just with a half-filled cavern, that is to say with $V_L V_{Lo}$, whereas at lesser and greater filling ratios the water surface in contact with air is in each case smaller and shrinks to the small cross-sectional areas of the sump 10 and the dome 9, respectively, that is to say practically to zero, when the cavern is fully charged and fully discharged. It must be noted here that the extent in width of the cavern is much greater than the width of the cross-sections of the dome and the sump which are expediently constructed to be square or circular.

In accordance with these relationships, the absorption of air in the water is less with such an inclined cavern than with horizontal caverns. Only the respective proportion of the top water layer in contact with air will become more enriched with air whereas the water layers lying underneath this top layer and those bounded by the cavern roof contain almost no air. The cross-sectional dimensions of the cavern are selected such that the water velocity at the area of contact between air and water is only a few cm/sec. From FIG. 3 it can be seen how the state of saturation C/Cs of the water as a function of the depth below the free water level changes with time and the water velocity as parameters. On the abscissa, C/Cs means the ratio of the respective local saturation C to 100% saturation Cs. For the surface 100% saturation is assumed which can be seen from C/Cs=1.0 for a depth of penetration=0.00 m. The time taken until the state of saturation is reached is greatly dependent on the motional state and the layer thickness of the water. The curves in FIG. 3 apply to three different motional states and for times of one week and one month, respectively.

Figure 4:
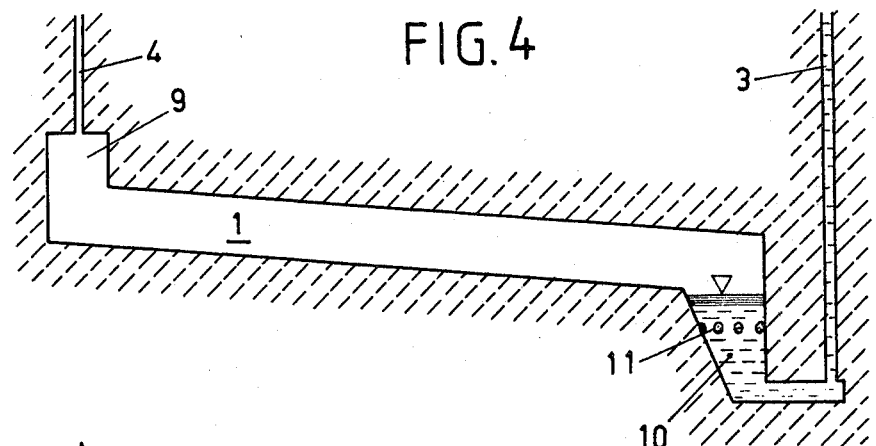
FIGS. 4 to 6 show the free surface of the water with different operating conditions of the air-storage gas turbine plant.
Figure 5:
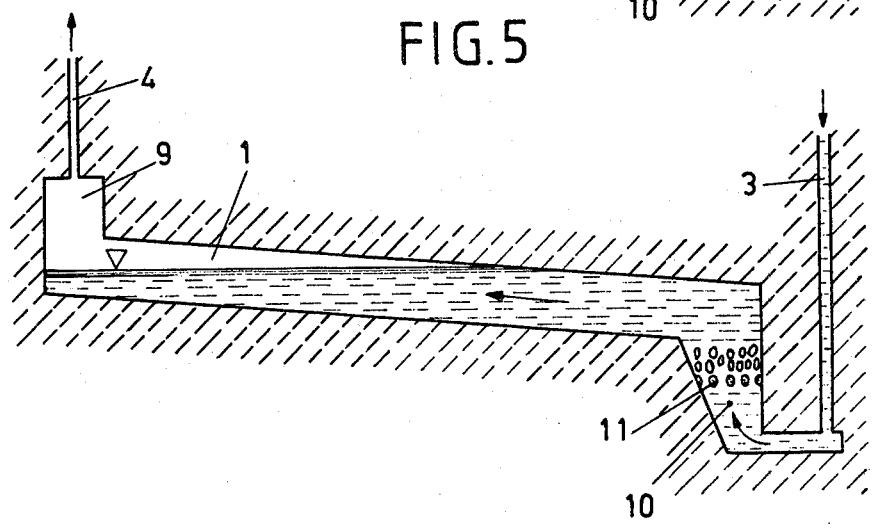

Thus, in the cavern according to the invention, absorption of air remains relatively low, on the one hand, and, on the other hand, the air-containing water layer always remains at the top and at the end of a charging process of the storage cavern remains in the top layers of the sump 10 as can be seen from FIG. 4. When the cavern is discharged, the vortex generator 11 generates vortices because of the fresh water which follows from the water tunnel 3 and which has been deaerated so that the air-containing water above the vortex generator is mixed with the fresh water and, as shown in FIG. 5, the degree of saturation of the water rising again when the cavern is emptied is again greatly reduced in the free surface layer. In the subsequent recharging of the storage cavern only very weakly saturated water will then reach the water tunnel 3 which is the reason why practically none or at most only weak bubbles are formed in this tunnel.

Figure 6:
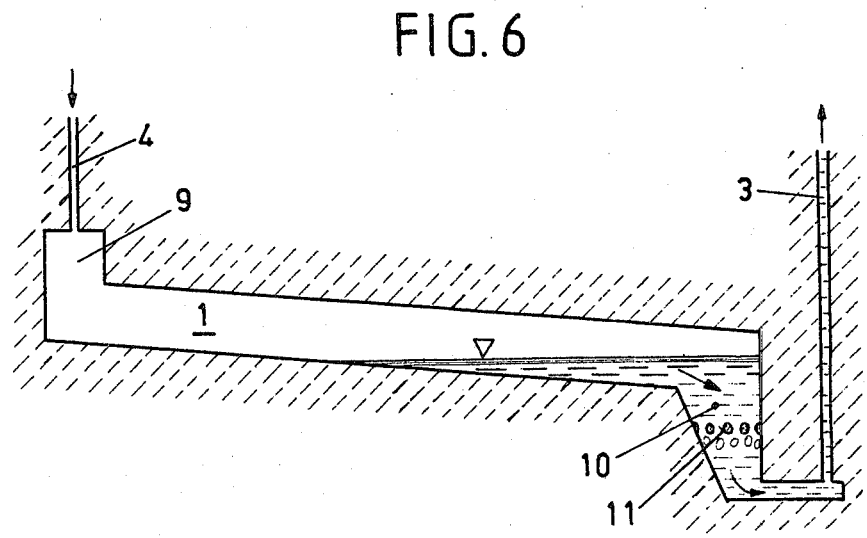

FIG. 6 shows a filling ratio during the charging process when the saturation of the top layer of water is already quite high. During the displacement process, vortices and weak bubbles are separated out below the vortex generator and as soon as the water level is wholly in the sump the top layer of the residual water is thus highly saturated as in FIG. 4. During the discharging vortices are formed above the vortex generator 11 as shown in FIG. 5.

Figure 3:
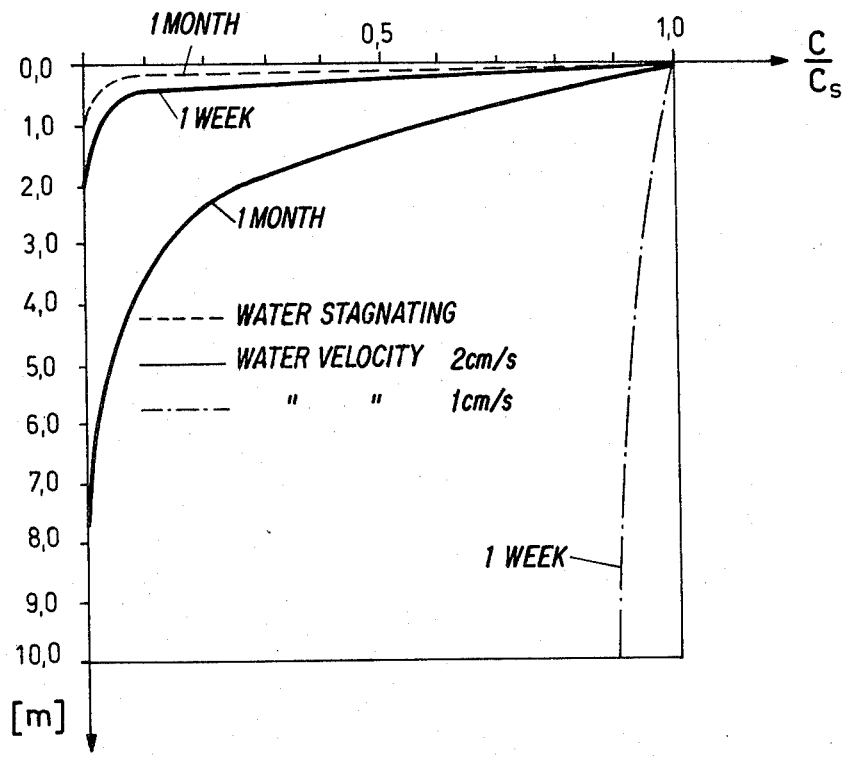
FIG. 3 shows the degree of absorption of air in water at different velocities of the water.

The maximum level 13 of the water level in dome 9, (see FIG. 1) is reached, for example, when the plant must be shut down for a prolonged period because of an inspection. The cavern is then first emptied until the maximum level 13 is reached so that the water surface in contact with air becomes very small. Since the thickness of the water layer is then great and the water is at rest, the quantity of air absorbed by the water will remain negligible even after one month as is shown in FIG. 3. The residual air volume in the dome must be maintained until the plant is taken into operation again in order to be able to start up the compressors with the aid of the turbine for the purpose of recharging the cavern. Thus it is a characteristic of this type of cavern construction that the residual air and residual water volumes in dome 9 and in sump 10, respectively, required for maintaining the operational readiness of the plant, are not evenly distributed over the whole width of the cavern but are concentrated at the ends of the cavern.

In order to prevent water from the cavern from reaching the turbine, the highest point of the air riser 4 is higher by a (see FIG. 1) after leaving the ground than the highest possible upper water level in the equalizing basin 2. As already mentioned, the blow-off valve 7 and the muffler box 8 are used for the complete emptying of the cavern.

In order to keep the degree of air saturation of the cavern water below the limit considered to be permissible, the degree of saturation can be measured when the water flows over from the sump 10 into the water tunnel 3 and an operational monitoring facility can be used to ensure that the cavern water is sufficiently frequently exchanged for fresh water.

In general, the floor and the roof of the cavern will be constructed to be inclined in parallel with each other at the same angle with respect to the horizontal. However, they can also have different angles of inclination.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A constant-pressure air-storage cavern with hydraulic pressure compensation for air-storage gas turbine power stations utilizing an equalizing basin located above ground and comprising:
    air feeder means for feeding air to gas turbines of said gas turbine power stations;
    water tunnel means for forming a water seal and for connecting the storage cavern with said equalizing basin; and
    air riser means for connecting the storage cavern with the air feeder means wherein a floor portion and a roof portion of the storage cavern are inclined at an acute angle with respect to horizontal for minimizing adsorption of air in fluid stored in said storage cavern.

2. A constant-pressure air-storage cavern as claimed in claim 1, wherein said floor portion and said roof portion of the storage cavern are parallel with one another.

3. A constant-pressure air-storage cavern as claimed in claim 1, wherein the storage cavern expands upwardly in an area of said air riser means so as to form a dome and also expands downwardly in an area of transition into said water tunnel means so as to form a sump.

4. A constant-pressure air-storage cavern as claimed in claim 3, wherein horizontal cross-sectional areas of said dome and said sump are relatively small in comparison with total floor area of said storage cavern.

5. A constant-pressure air-storage cavern as claimed in claim 3, further comprising a vortex generator positioned in said sump and wherein said vortex generator further comprises a grid member.

* * * * *